United States Patent [19]

Buck et al.

[11] 4,017,855
[45] Apr. 12, 1977

[54] SPIN ECHO MATCHED FILTER ECM DETECTOR

[75] Inventors: Daniel C. Buck, Hanover; Dickron Mergerian, Baltimore, both of Md.

[73] Assignee: Westinghouse Electric Corporation, Pittsburgh, Pa.

[22] Filed: Jan. 29, 1973

[21] Appl. No.: 327,538

[52] U.S. Cl. .............................. 343/18 E; 324/.5 A
[51] Int. Cl.$^2$ .......................................... G01S 7/36
[58] Field of Search ...................... 343/5 SA, 18 E; 324/.5 A

[56] References Cited

UNITED STATES PATENTS

| 3,147,427 | 9/1964 | Varian | 324/.5 A |
| 3,513,382 | 5/1970 | Hill et al. | 324/.5 A |
| 3,577,145 | 5/1971 | Worden et al. | 324/.5 R |
| 3,636,562 | 1/1972 | Wehner | 343/5 SA |
| 3,701,154 | 10/1972 | McKinney | 343/18 E |

Primary Examiner—Malcolm F. Hubler
Attorney, Agent, or Firm—J. B. Hinson

[57] ABSTRACT

A system for determining the use of an ECM jammer against a bi-frequency radar utilizing a spin echo matched filter. Portions of two simultaneously transmitted radar RF pulses of different instantaneous carrier frequencies are coupled to a non-linear element which produces a composite pulse signal containing predetermined intermodulation product frequencies. This composite pulse signal is utilized as the input pulse to a spin echo system which has a locally generated postset pulse applied a predetermined time thereafter. The radar return signals are coupled to the spin echo system which produces a spin echo correlation signal upon the reception of an ECM radar return pulse which inherently contains substantially the same predetermined intermodulation product frequencies.

11 Claims, 2 Drawing Figures

SPIN ECHO MATCHED FILTER ECM DETECTOR

BACKGROUND OF THE INVENTION

1. Field of the Invention

The present invention relates generally to spin echo apparatus and more particularly to a spin echo system which is capable of detecting and distinguishing between an ECM deception signal and a true skin radar return from a target being struck by RF pulses transmitted from a radar system.

A spin echo phenomenon normally exists when a paramagnetic sample is located in a resonant cavity situated in a homogeneous DC magnetic field such that when a first or "input" RF pulse having a frequency equal to the characteristic or "Larmor" frequency of the sample is applied with its RF magnetic field substantially at right angles to the DC magnetic field whereupon a torque is applied to the magnetic moment of the sample which causes it to be tipped away from the direction of the magnetic field. The angle of tipping, that is the angle between the moment and the direction of the field is proportioned to the magnitude of the field and the time during which the RF pulse exists. Upon release of the displacing force, the spinning electrons urged again towards realignment by the force of the magnetic field rotate or precess about the field in much the same manner as a tipped gyroscope. When a sample is subsequently subjected to another or "recall" RF pulse whose RF magnetic field is also directed normal or transverse to the magnetic field, the sample spontaneously develops a magnetic field of its own which is also normal to the magnetic field and which rotates about the latter's direction. The strength of the rotating field builds up to a maximum and then decays which is then detected as an electrical pulse called a "spin echo signal".

2. Description of the Prior Art

Pulsed nuclear induction spin echo systems are well known to those skilled in the art, being taught for example by U.S. Pat. No. 2,887,673 issued to E. L. Hahn. Electron spin echo systems, moreover, are taught in U.S. Pat. No. 3,129,410 issued to P. P. Sorokin. Additionally, a system for generation of an echo similar to a spin echo signal without the need for an external magnetic field has been developed by the assignee of the present invention, utilizing a very heavily doped sample of paramagnetic material such as titanium dioxide (rutile) doped with iron group transition metal ions wherein the doping concentration is in the order of $1 \times 10^{19}$ to $1 \times 10^{21}$ defects centers per centimeter $^3$. This concept is taught in U.S. Pat. No. 3,671,855 entitled "Broadband Zero Field Exchange Echo System". Nickel doped rutile as a spin echo sample obviating the need for an external magnetic field is disclosed in U.S. Ser. No. 33,201 entitled "High Bandwidth-Time Product Spin Echo System". The latter invention is also assigned to the assignee of the present invention.

The present invention has for its object the application of spin echo techniques to radar technology and is directed to means for determining the use of an ECM (electronic countermeasure) jammer used against a bi-frequency pulse radar system and comprises coupling a portion of two radar RF pulses, one at an instantaneous carrier frequency $f_1$ and the other at a frequency $f_2$ with the frequencies being separated by a difference frequency $\Delta f$ where $\Delta f \ll f_1$ and $f_2$ to a nonlinear element which provides a composite RF return having intermodulation product frequencies substantially the same as an ECM jamming equipment would produce. For example a resistive nonlinearity will give rise to third-order intermodulation product frequencies equal to $2f_2 - f_1$ and $2f_1 - f_2$. The RF pulse containing the intermodulating products is coupled to a spin echo system tuned to the center frequency of the composite RF pulse. A wideband post-set pulse is locally generated a predetermined time delay thereafter and is also fed to the spin echo system whose post-set pulse sets the spin system and produces a first spin echo signal which is not seen at the output of the spin echo system due to the fact that a detector is gated off during this interval. During the radar receive time, the target return signals are fed to the spin echo system. Since a target skin radar return signal does not contain intermodulation product frequencies, a correlation spin echo signal will not be produced, however, an ECM return signal from the target will contain the aforementioned intermodulation product frequencies which when coupled into the spin echo cavity will produce a correlation spin echo signal after a time substantially equal to the time difference between the intermodulation frequency RF pulse fed to the spin echo system and the post-set pulse. During the latter time interval, however, the detector is gated "on" and is responsive to the correlation spin echo signal produced by the ECM return signal thereby indicating that a countermeasure system is operating against the radar.

DESCRIPTION OF THE PREFERRED EMBODIMENT

Figure 1:
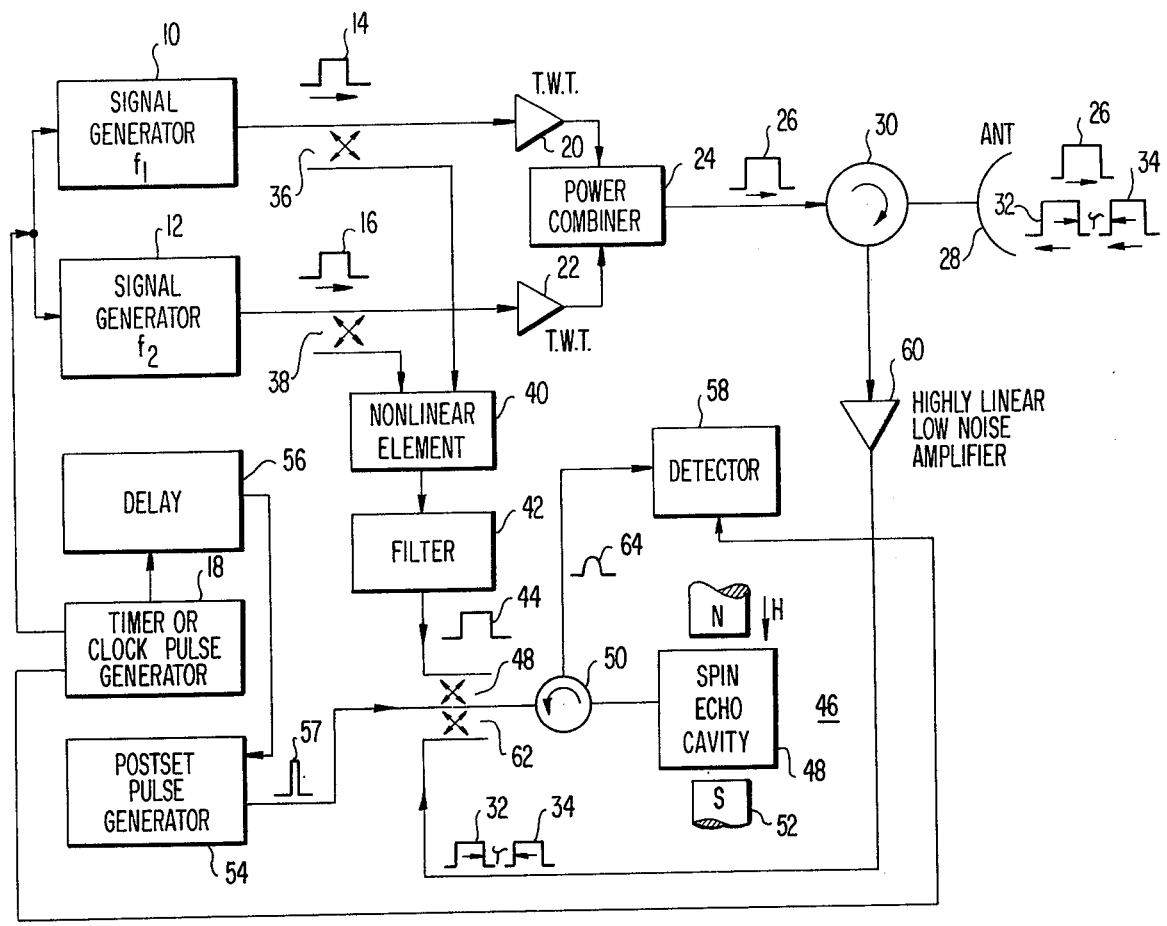
FIG. 1 is a block diagram of the preferred embodiment of the subject invention.
Figure 2:
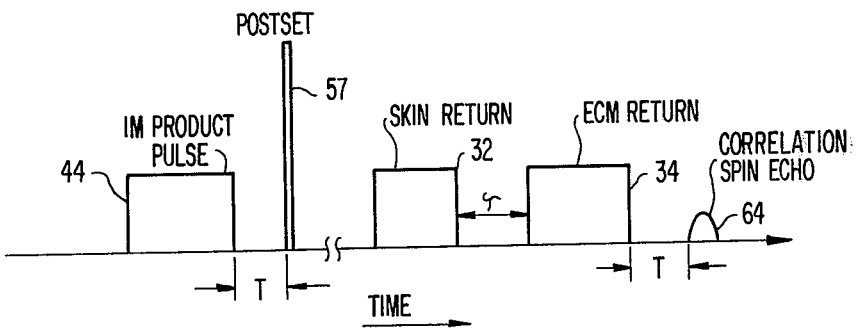
FIG. 2 is a number of time related waveforms illustrative of the operation of the embodiment shown in FIG. 1.

Referring now to the drawings and more particularly to FIG. 1, reference numerals and 10 and 12 denote two RF radar pulse signal generators or modulators respectively generating radar pulses 14 and 16 having an instantaneous carrier frequency $f_1$ and $f_2$ respectively. The radar pulses 14 and 16 are simultaneously generated in accordance with a trigger coupled to the signal generators 10 and 12 from a timer or clock pulse generator 18. The clock pulse generator is often times referred to as a synchronizer. The two radar pulses 14 and 16 are fed to highly linear RF amplifiers 20 and 22 which may be, for example, traveling wave tubes (TWT). Highly linear amplifiers are required so as to produce substantially no intermodulation product frequencies inherently associated with nonlinear devices. The RF pulse outputs from the RF amplifiers 20 and 22 are fed to a power combiner 24 also configured of a highly linear device whereupon a composite bi-frequency radar pulse 26 is coupled to a radar transmitting and receiving antenna assembly 28 by means of microwave circulator device 30. It should be noted that when desirable, the circulator device 30 may be comprised of a conventional transmit/receive (T/R) device well known to those skilled in the art. The transmitted bi-frequency radar pulse 26 is radiated from the antenna assembly 28 whereupon a skin radar return pulse 32 is received and in the event that the target includes an ECM transmitter, it operates to reradiate a return signal 34 after a time delay $\tau$. Whereas the skin return pulse 32 is a replica of the transmitted pulse 26, an ECM return pulse 34 emits certain intermodulation product frequencies, for example $2f_1 - f_2$ and $2f_2 - f_1$, which is inherent in such apparatus.

Accordingly, the present invention has for its purpose the detection of the ECM pulse 34 and to his end a portion of the two simultaneous radar pulses 14 and 16 are coupled by means of respective waveguide couplers 36 and 38 to a nonlinear element 40 such as a diode which produces a composite RF pulse having intermodulation product frequencies substantially the same as those expected from an ECM apparatus. The nonlinear element 40 is fed to a frequency filter 42 for eliminating any undesirable frequencies. The RF pulse 44 is coupled to a spin echo system 46 by means of a microwave coupler 48 and a circulator device 50. The spin echo system includes a suitable microwave cavity 48 having a paramagnetic sample, not shown, contained therein and located between the poles of a DC magnet 52 chosen to generate a field H in order to provide electron paramagnetic resonance at the center frequency of the RF pulse 44. The magnetic field H is slightly non-homogeneous to provide sufficient line broadening to accept the total bandwidth of the RF pulses 44 but when desirable, a sample comprised of nickel doped titanium dioxide (rutile) can be utilized which provides a very high bandwidth-time (BT) product without the need for an external DC magnetic field. The composite RF pulse 44 containing intermodulation product frequencies is applied to the spin echo system as the well known "input" pulse of a spin echo system. A second or post-set RF pulse is applied to the spin echo system after a predetermined time T which pulse is produced by an RF pulse generator 54 triggered from the clock pulse generator 18 after a time delay T provided by a time delay circuit 56. The "post-set" RF pulse 57 produced by pulse generator 54 has a bandwidth which is flat over the frequency spectrum of the composite RF pulse 44 applied to the spin echo system 48. After a corresponding time T after the application of the post-set pulse 57 to the spin echo system 46 through the circulator 50, a spin echo signal will be produced and fed out of the cavity 48 to the circulator where it is then fed to a gated detector circuit 58. However, the clock pulse generator 18 couples a signal to the detector 58 to render the detector circuitry inoperative at the time the first spin echo signal is produced following the application of the post-set pulse 56 to the system.

The radar return signals which comprise the skin return pulse 32 and possibly an additional delayed ECM return 34, the latter being present when an external jammer ECM system is operating against the radar, is coupled to the spin echo system 46 by means of the circulator 30, a highly linear low noise amplifier 60, and a microwave coupler 62 feeding into the circulator 50. The skin return pulse 32 when fed to the spin echo cavity 48 will not produce a spin echo correlation signal because the system has been "set" to the intermodulation product frequencies of the composite RF pulse 44; however, upon the appearance of the ECM return pulse 34 into the spin echo cavity 48, the spin echo system will produce a correlation spin echo signal 64 after a time T. The detector 58, meanwhile, has been rendered operative by the clock pulse generator 18 which is now responsive to the spin echo signal 64. Thus the spin echo system 46 acts as a matched filter for detecting a radar jamming signal.

It should be pointed out that the radar pulse carrier frequencies $f_1$ and $f_2$ are separated by a difference frequency $\Delta f$ where $\Delta f << f_1$ and $f_2$. Where the RF carrier frequencies $f_1$ and $f_2$ are fixed frequencies, the intermodulation product frequencies referred to comprise third order intermodulation products corresponding to $2f_1 - f_2$ and $2f_2 - f_1$. When desirable, the radar pulse 14 and 16 may be comprised of more complex "chirped" or "spread spectrum" signals instead of simple narrow band pulses with center frequencies of $f_1$ and $f_2$. In the case of a "chirped" signal where the first pulse is chirped, i.e. varied linearly from $f_1$ to $f_2$ while the second pulse is chirped from $f_3$ to $f_4$, the intermodulation product frequencies would now be spread over a band from $2f_1 - f_3$ to $2f_2 - f_4$. In the case of a spread spectrum signal, the intermodulation product frequencies would extend from $2f_1 - f_4$ to $2f_2 - f_3$. In either case, however, a spin echo system utilizing a fixed frequency cavity of suitable Q to accept that bandwidth in question together with a permanent magnet chosen to provide the correct electron paramagnetic resonance center frequency to yield sufficient line broadening to accept the total bandwidth, can be utilized to pulse compress and subsequently detect the generated intermodulation signal produced by an ECM set.

It should be pointed out that the radar pulses 14 and 16 and frequencies $f_1$ and $f_2$, respectively, should be amplified in separate channels to avoid the nonlinearity of the power amplifiers 20 and 22. Secondly, the power combiner 24 required that the resistances and/or loads be linear so as to produce substantially no intermodulation products which occur when nonlinear devices appear in the circuit. Thirdly, the amplifier 60 must necessarily be highly linear in order to produce no additional intermodulation products already present in the ECM return signal 34 as well as adding them to the skin return signal 32 which could possibly give rise to its own spin echo signal if the system is not properly tuned.

Having described what is at present considered to be the preferred embodiment of the subject invention, we claim:

1. An intermodulation product frequency detector of a received RF signal comprising in combination:
   a first and second RF source respectively generating transmitted pulses of a first and second instantaneous carrier frequency simultaneously and having a predetermined frequency difference therebetween;
   means coupled to said first and second RF source for sampling a portion of said pulses transmitted and providing a composite RF pulse therefrom having intermodulation product frequencies substantially the same as those to be detected;
   a spin echo system operable as a matched filter coupled to said above recited means and having a microwave cavity with a paramagnetic sample located therein tuned to a paramagnetic resonance center frequency in the region of said intermodulation product frequencies, said spin echo system receiving as a first input signal said composite RF pulse;
   another RF source generating a RF pulse having a bandwidth substantially covering the frequency spectrum of said intermodulation product frequencies after a predetermined time delay and including means coupling said RF pulse as a second input to said spin echo system for setting the spin system of the paramagnetic sample to said composite RF pulse; and relatively highly linear circuit means coupling said received RF signal to said spin echo system, said RF signal causing a spin echo signal to be produced after said predetermined time delay in the event that intermodulation product frequencies to be detected are present.

2. The apparatus as defined by claim 1 whereby said first and second RF source generate the pulses of frequencies $f_1$ and $f_2$, respectively, and having a frequency difference $\Delta f$, where $\Delta f << f_1$ and $f_2$.

3. The apparatus as defined by claim 2 wherein said first and said second RF source comprise radar RF pulse signal generators and additionally including linear power combiner means coupled to said generators for providing a bi-frequency composite radar pulse, and antenna means coupled to said power combiner means for radiating said radar pulse.

4. The apparatus as defined by claim 3 and additionally including microwave circulator means coupling said antenna means to said relatively highly linear circuit means.

5. The apparatus as defined by claim 3 and additionally including respective relatively linear power amplifier means coupled between said signal generators and said power combiner means.

6. The apparatus as defined by claim 1 wherein said first and second RF source comprises radar pulse modulators, and said means coupled to said first and second RF source comprises respective microwave couplers and a nonlinear circuit element connected to said couplers providing said composite RF pulse.

7. The apparatus as defined by claim 6 and additionally including frequency filter means coupled between said nonlinear circuit element and said spin echo system for removing undesired frequencies.

8. The apparatus as defined by claim 7 and additionally including a highly linear power combiner coupled to said first and second radar pulse modulator and a common transmit-receive antenna assembly coupled to said power combiner and wherein said received RF signal having intermodulation product frequencies comprises an ECM signal generated from the transmitted signal from said combiner circuit.

9. The apparatus as defined by claim 8 and additionally including common input and output coupling means to said microwave cavity, and a spin echo signal detector coupled to said common coupling means.

10. The apparatus as defined by claim 9 wherein said common input/output coupling means comprises a microwave circulator.

11. The apparatus as defined by claim 10 and additionally including circuit means rendering said detector circuit operative only during the time said receive radar RF signals are present.

* * * * *